United States Patent

[11] 3,579,042

[72] Inventor Irving J. Abend
Bergenfield, N.J.
[21] Appl. No. 786,027
[22] Filed Dec. 23, 1968
[45] Patented May 18, 1971
[73] Assignee Lear Siegler, Inc.
Santa Monica, Calif.

[54] PROTECTION CIRCUIT WITH SIMULTANEOUS VOLTAGE AND CURRENT SENSING MEANS
17 Claims, 2 Drawing Figs.

[52] U.S. Cl. .......... 317/33, 317/16, 317/36, 330/11
[51] Int. Cl. .......... H02h 7/00
[50] Field of Search .......... 317/33, 27, 31, 36; 330/15, 22, 69, 144, 207, 51, 11 (P); 323/22 (T); 307/202; 328/8, 9; 330/102; 307/296; 317/17

[56] References Cited

UNITED STATES PATENTS

| | | | |
|---|---|---|---|
| 3,371,262 | 2/1968 | Bird et al. | 317/33X |
| 3,049,632 | 8/1962 | Staples | 317/33 |
| 3,125,715 | 3/1964 | Brooks | 323/22 |
| 3,379,935 | 4/1969 | Hoel | 317/36 |

FOREIGN PATENTS

| | | | |
|---|---|---|---|
| 965,726 | 8/1964 | England | 330/51 |

*Primary Examiner*—J. D. Miller
*Assistant Examiner*—U. Weldon
*Attorney*—Ward, McElhannon, Brooks & Fitzpatrick

ABSTRACT: Dynamic short circuit and overload protection circuit for transistorized power amplifiers; the circuit is noninstantaneous in operation and comprises means for sensing current through and voltage across a transistor to be protected, means for combining, and integrating with respect to time, signals related to the sensed voltage and current to provide a control signal, and means for shunting the input to the transistor when the control signal reaches a predetermined value.

Patented May 18, 1971

3,579,042

2 Sheets-Sheet 1

Figure 1:
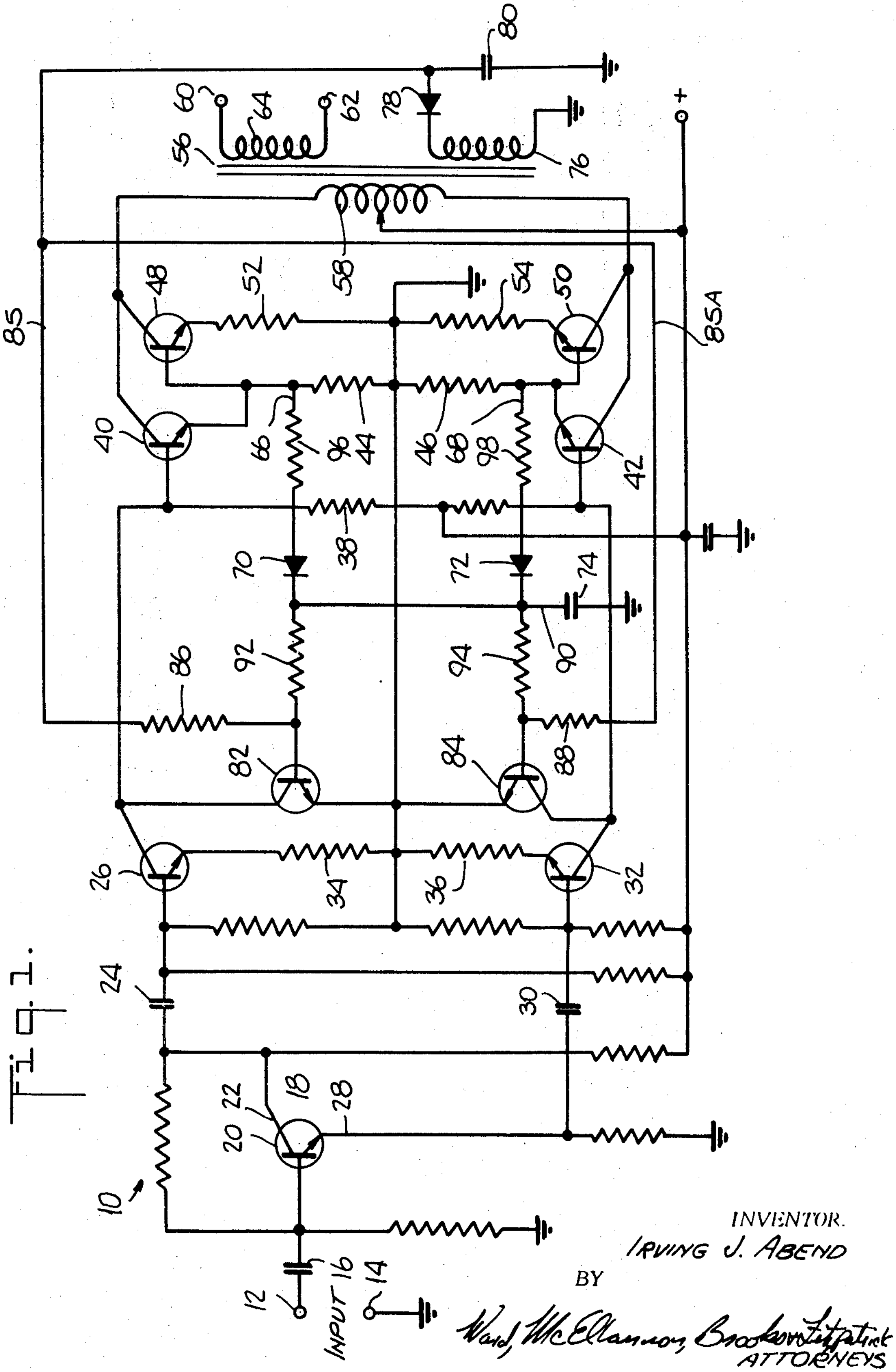

INVENTOR.
IRVING J. ABEND
BY
Ward, McElhannon, Brooks & Fitzpatrick
ATTORNEYS

INVENTOR.
IRVING J. ABEND
BY
Ward, McElhannon, Brooks & Fitzpatrick
ATTORNEYS

PROTECTION CIRCUIT WITH SIMULTANEOUS VOLTAGE AND CURRENT SENSING MEANS

This invention relates to protection circuits and, more particularly it pertains to dynamic short circuit and overload protection circuits for transistorized power amplifiers and the like.

Most transistors do not have inherent current limiting mechanisms as do many vacuum tubes, and thus it will be appreciated that when their output load is a short circuit and their input is a large signal, the transistors are operated in their unsafe operating area and most likely will be destroyed because of excessive power dissipation. To prevent the destruction of amplifiers utilizing transistors, a number of circuits have been developed to protect the output thereof, but each circuit known to date exhibits some drawbacks.

Thus, in one known protection circuit arrangement current through a resistor serially connected in the output circuit of the transistor to be protected is sensed, and when a voltage caused by the sensed current exceeds a predetermined level, a gating element, such as an avalanche diode or the like, is actuated to conduct the harmful excess drive current away from the transistor thereby limiting the maximum current the output transistor may conduct. A common failing of this type of circuit is that only the current through the transistor is used to actuate the protection circuit. The amount of instantaneous power dissipation of the transistor, however, is equal to the product of the instantaneous current through the transistor and the instantaneous voltage across the same. Thus, the main fault with this type of protection circuit is the fact that since the protection circuit senses only current in the transistor to be protected and overlooks its voltage, the transistor must be capable of handling power dissipation far in excess of normal operation and thus a very large transistor having a large heat sink must be utilized.

Other known protection circuits protect output transistors not only against excessive current as in the previously described arrangement, but also against excessive voltage and excessive power dissipation. In these other protection circuit arrangements, the output current of the transistor is measured as a voltage drop across an emitter resistor, and the voltage across the transistor is measured by a voltage divider resistor arrangement. Thereafter, the measured current through the transistor and the measured voltage across the transistor are summed. Once this sum exceeds the breakdown voltage of a gating device, such as an avalanche diode, the gating device shunts or conducts excessive drive current from the transistor. Although basically this circuit has been found satisfactory as far as limiting the maximum dissipation in the transistor close to that in normal operation, it has many disadvantages especially under certain conditions of operation. As may be appreciated, this type of protection circuit arrangement works instantaneously. This instantaneous dynamic short circuit protection mechanism generally has to operate, however, from current and voltage sensing points in different parts of the circuit. If any reactive components in the circuit cause the phase between the voltage and current of the circuit to change over any part of the frequency spectrum, operation of the protection circuit is either impaired or its effectiveness has to be compromised for satisfactory operation. In addition, because the protection circuit is essentially instantaneous, its transition from nonoperating to operating mode produces extremely fast transients. These transients can cause ringing or oscillations, depending on the circuit parameters and frequencies utilized. In addition, in amplifier circuits utilizing an output transformer (especially when the output transformer is unloaded), extremely high voltages due to rapid current changes may cause breakdown of the output transformer and circuit transistor. Another limitation of this described circuit arrangement is its inflexibility in regard to the degree of protection afforded under short circuit or overload conditions. Thus, the current in the output load can be limited down to a minimum value and no more, thus preventing its complete cutoff. This fact can present a problem in overall dissipation of the output transistor, especially when circuit compromises are made to overcome some of the defects described above.

While most output transistors of transistorized power amplifiers need regulation, I have found that, contrary to most assumptions in prior art arrangements, such output transistors do not need instantaneous regulation. In accordance with the present invention, I take advantage of the fact that transistors can stand higher loads than their published ratings for very short intervals without breakdown or destruction. Thus, I provide a protection circuit which is noninstantaneous in operation, and which may operate over a period of cycles rather than every cycle as in the prior art arrangements. With this type of noninstantaneous protection circuit, I am able to avoid the high transients which cause oscillation, as well as avoid any voltage breakdown problems caused by rapid current changes. In addition, since the protection circuit of the present invention is essentially noninstantaneous, it is relatively insensitive to reactive loads.

In accordance with one aspect of the present invention, the objects of the invention are carried out by utilizing voltage and current sensing in the manner described above, but instead of regulating the transistor to be protected with these sensed signals instantaneously, these signals are combined and integrated with respect to time to provide a control signal to operate the protection circuit. Thus, by this arrangement, the protection circuit will allow very large instantaneous current and voltages to pass, such as over a few cycles, but smaller currents and voltages of longer duration and having a large area encompassed in their $v(t)$ and $i(t)$ functions are utilized to actuate the protective circuit. Although the action of the circuit is not instantaneous because of the time constant involved, the protection circuit of the present invention basically performs the same function without the above-noted limitations and circuit problems exhibited by the prior art instantaneous method.

Basically, the protection circuit of the present invention operates as follows. Current is sensed across a resistor somewhere in the output circuit of the transistor. This resistor may be an emitter resistor in the driving transistor, in the output transistor, or positioned in the output transformer, or in a separate current transformer coupled to the output circuit. The voltage developed across this resistor is rectified and the resulting current produced is integrated with respect to time by means of a capacitor. Voltage is sensed by means of a voltage developed across the output load impedance of the transistor. This load could be across the output of a transformerless circuit or across the primary or secondary windings of an output transformer or radio frequency tank coil. The output voltage across the load is rectified and, as in the current sensed signal, the resultant current is also integrated by means of a capacitor.

The charges produced across the integrating capacitors by the current and voltage sensing signals are coupled through coupling resistors to the base of a switching transistor. The polarity of the voltage and current sensing signals are arranged so that they are opposite, e.g., voltage negative, current positive, and the switching transistor is arranged so that it shunts some part of the input away from the transistor to be protected when the switching transistor is forward biased to conduct. Thus, by proper choice of the resistors feeding the sensed current and voltage to the base of the switching transistor a differential current, which is the difference between the currents supplied by the voltage and current integrating capacitors, is produced. Depending on design criteria, this differential current will cause a voltage exceeding the offset voltage of the switching transistor when the output across the load falls below a predetermined level. This predetermined level relates to the duration and the amplitude of the current which the transistor may safely tolerate whereby the protection circuit is nonresponsive to very large instantaneous currents and voltages of the short duration, and maintains the operating range of the amplifier and device within acceptable limits.

In accordance with another aspect of the present invention, various effects characteristic of each type of output circuit can be achieved by adjusting the charging time constants of the voltage and current sensing circuits as well as their discharge time constants through the coupling resistors and switching or shunting transistor so as to produce a low level pulse to warn of overload as well as perhaps symmetrical of asymmetrical clipping, depending on the location of the shunting transistors. In addition, reaction to overloads or short circuits can be varied by means of the time constant.

There have thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit and scope of the invention.

Figure 2:
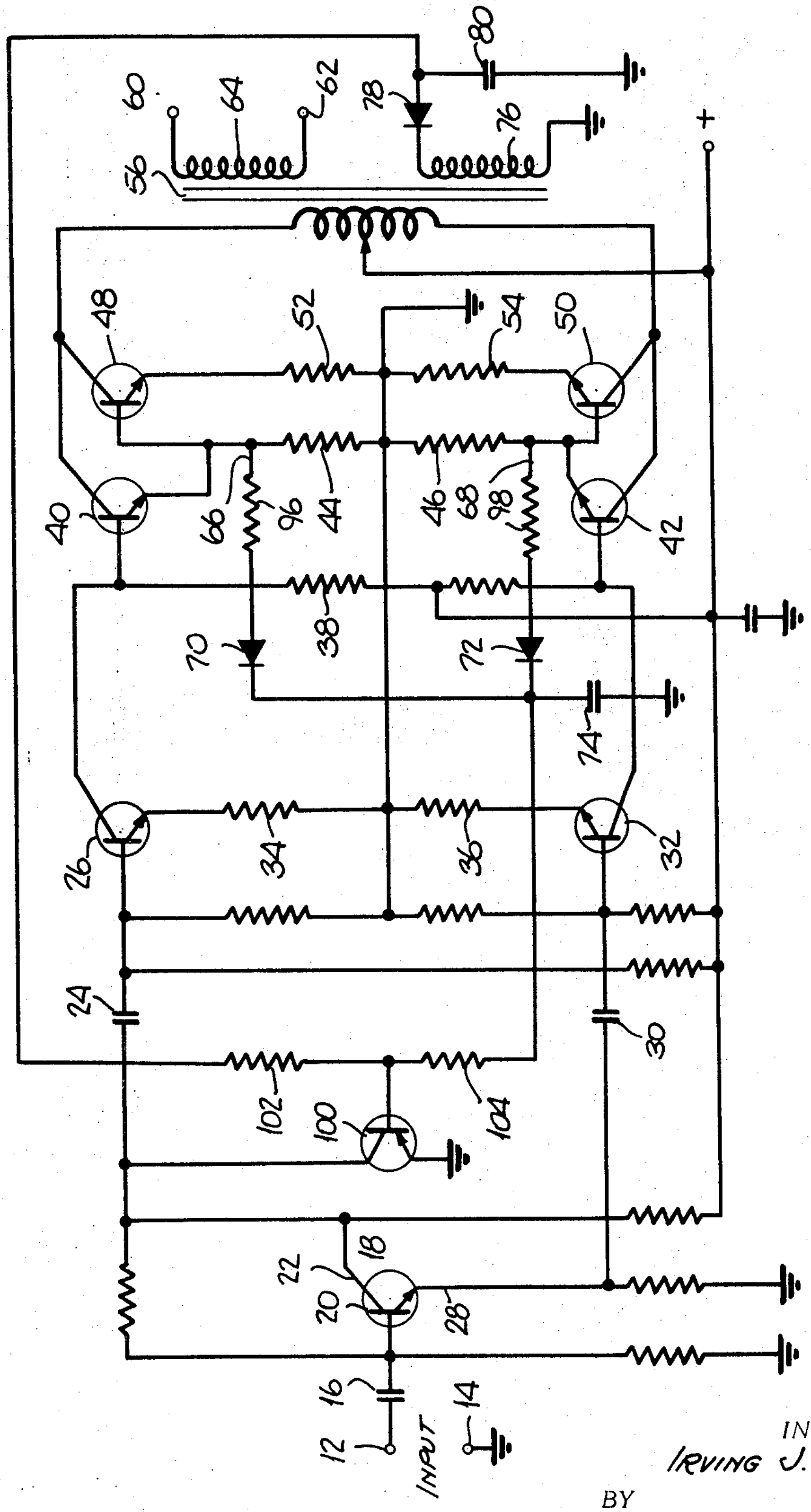

Specific embodiments of the invention have been chosen for purposes of illustration and description and are shown in the accompanying drawings forming a part of the specification wherein;

FIG. 1 is a schematic circuit diagram of a transistorized power amplifier having a short circuit and overload protection circuit constructed in accordance with the present invention and arranged in a push-pull stage; and FIG. 2 is a schematic circuit diagram of a transistorized power amplifier having a short circuit and overload protection circuit constructed in accordance with the present invention and arranged in a single ended stage thereof.

Referring now to the drawings in detail, and specifically to FIG. 1, there is shown a power output stage, shown generally at 10, which is arranged in push-pull fashion and which has a transformer coupled output. The input for the stage 10 is applied across input terminals 12 and 14, respectively, terminal 14 being referenced to ground and terminal 12 being coupled through a coupling capacitor 16 to a phase inverter stage, shown generally at 18, and formed, in part, by a transistor 20. The phase inverter 18 is coupled by collector 22 of the transistor 20 and through a coupling capacitor 24 to a first driving transistor 26; and emitter 28 of the transistor 20 is coupled through a coupling capacitor 30 to the base of a second driving transistor 32. The transistors 26 and 32 are suitably biased by emitter resistors 34 and 36, respectively, and by a load resistor 38 to form two common emitter transistors with respect to ground. The transistors 26 and 32, in turn, drive transistors 40 and 42, respectively, which are emitter coupled by resistors 44 and 46 to the base of output transistors 48 and 50 also having emitter resistors 52 and 54, respectively.

The output of the above-described push-pull amplifier includes an output transformer 56 having a primary winding 58 connected to the collectors of transistors 48 and 50. The output of the power output stage is coupled from the terminals 60, 62 of the secondary winding 64 of the output transformer 56.

In accordance with the present invention, the voltage across the emitter resistors 44 and 46 with respect to ground, is taken as a measure of the current in the output transistors and is coupled via leads 66 and 68, respectively, through diodes 70 and 72 to charge an integrating capacitor 74 connected from the output of the diodes 72 and 70 to ground. As shown in FIG. 1, the diodes 70 and 72 are arranged so that the voltage taken across the emitter resistors 44 and 46 is full wave rectified and applied in a positive voltage direction with respect to ground across the integrating capacitor 74.

Voltage sensing in the preferred arrangement is achieved by means of another secondary winding 76 of the output transformer 56. The signal developed across the secondary winding 76 is rectified by a diode 78 and is applied across an integrating capacitor 80. The capacitor 80 is connected between the cathode of the diode 78 and ground. As also shown in the single FIGURE of the drawings, the diode 78 is so arranged so that the output voltage developed across the secondary winding 76 charges the integrating capacitor 80 negatively with respect to ground.

The collectors of the driving transistors 26 and 32 are connected to ground by means of shunting transistors 82 and 84, respectively, and thus are utilized as shunting means for shunting excess current developed under overload or short load circuit conditions directly to ground and away from the remaining portion of the amplifier circuit 10. To this end, the voltage indicating signal developed across the integrating capacitor 80 is fed by leads 85 and 85A through biasing resistors 86 and 88, respectively, to the bases of the shunting transistors 82 and 84. Similarly, the current indicating output signal produced across the integrating capacitor 74 is fed by a lead 90 through resistors 92 and 94, respectively, to the bases of the shunting transistors 82 and 84. The resistors 86 and 92 as well as resistors 88 and 94 are used to adjust the resultant differential current produced by the oppositely poled integrating capacitors 74 and 80 and fed to the shunting transistors 82 and 84.

Under normal conditions of operation, the resistors 86, 88, 92 and 94 are arranged so that a negative current is produced through the resistors 86 and 88 which is sufficiently just below, the same as, or above the positive current produced through the resistors 92 and 94, respectively, to maintain the base to emitter voltage of the shunting transistors 82 and 84 below that which is necessary for these transistors to conduct. In addition, resistors 86, 88, 92 and 94 are relatively arranged so that under overload and short load conditions, the resultant lowering of the voltage (store charge) across the integrating capacitor 80 will reduce the current flow through resistors 86 and 88 to a level such that shunting transistors 82 and 84 will conduct and shunt some of the drive current away from the bases of the transistors 40 and 42.

Should an overload occur across one of the transformer secondary windings, the resultant lowering of the voltage across the integrating capacitor 80 will reduce the current flow through resistors 86 and 88 and, as stated above, the offset voltage of the bases of the shunting transistors 82 and 84 will be reached and these transistors will shunt some of the drive current away from the bases of the driving transistors 40 and 42 to maintain the necessary level of dissipation in the output transistors 48 and 50, respectively. If a short circuit occurs across the secondary of the output transformer 56, no store charge will appear across the integrating capacitor 80 since at this time all the voltage is completely dropped across the output transistors 48 and 50. Accordingly, the charge stored in the integrating capacitor 74, as a result of the large amount of current flowing through the emitter resistors 44 and 46, is discharged through the base-emitter junction of the shunting transistors 82 and 84 thus driving these shunting transistors in a greater degree. As known, the shunting effect of shunting transistors 82 and 84 is largely dependent upon the current flow into the base-emitter junction of these transistors and, in the specific embodiment disclosed, upon the magnitude of this current as determined by the voltage drop across the emitter resistors 44 and 46, respectively. Thus, the higher the voltage across emitter resistors 44 and 46, the more current is limited in the output of the transistors 48 and 50. Ideally, and assuming that the stored charges on the integrating capacitors 74 and 80 were identical, a short circuit in the output transformer 56 would operate the protection circuit so that no current flows in the output transistors 48 and 50. Due to circuit requirements, however, this condition is not met in the illustratively embodied circuit. By taking the current sensing across the emitter resistors 44 and 46, respectively, a static offset positive voltage equal to about that required for the rectifiers 70 and 72 to conduct is maintained. This voltage is about that required by the output transistors 48 and 50 base to emitter. Accordingly, if the output transistors 48 and 50 and the diodes 70 and 72 are silicon semiconductor devices, this voltage offset will be close to that of the required value, and thus operation of the circuit will then be mainly due to the current through the emitter resistors 54 and 52 of the output transistors 48 and 50, and only to some extent the current in the emitter resistors 44 and 46.

Oscillations may occur if the charging time constant of the voltage sensing circuit is longer than that of the charging time constant of the current sensing circuit. If it is desired to prevent these oscillations, resistors 96 and 98 can be inserted in series with the diodes 70 and 72, respectively, to increase the charging time constant of the current sensing circuit. In addition, the discharge time constant of the voltage sensing circuit should also be longer than the discharge time constant of the current sensing circuit. This can be arranged by the proper selection of values for the integrating capacitor 80 and coupling resistors 86 and 88, respectively.

The proper choice for the charging and discharging time constants of the current sensing and voltage sensing circuits depends on the lowest frequency to be passed by the amplifier circuit and upon the time required for the circuit to act. The acting time of the circuit obviously is dependent on the characteristics of the output transistors 48, 50 as regards safe operation under maximum current and voltage levels, as well as on the thermal time constants that these transistors may have, such as junction to case, case to heat sink and heat sink to air.

The overload and short circuit protection circuit of the present invention may also be utilized to control single ended amplifiers as well. As shown in FIG. 2 wherein like reference numerals indicate like structure and function as those shown in FIG. 1 and described above, respectively, a shunting transistor 100 having its collector and emitter coupled across the collector of the inverter stage 18 and ground is driven by the coupling resistors 102 and 104 connected across the integrating capacitors 80 and 74, respectively. The differential resistors 102 and 104 correspond and function similar to resistors 86 and 88, and 92 and 94, respectively, described above. The output of inverter stage 18 may be a single ended configuration rather than the push-pull arrangement shown in FIG. 2. Thus, in operation under overload or short circuit conditions, the inverter stage 18 is shunted by the shunting transistor 100.

Although the protection circuit described as the preferred embodiments is developed primarily for the protection of transistors in power amplifiers, it will be appreciated that similar configurations may be used in very high power tube amplifiers.

Thus, it will be appreciated that in accordance with the present invention, there is provided a short circuit and overload protection circuit which is relatively free of reactive loads and which produces few transients and which is relatively free of voltage breakdown and the like.

I claim:

1. An electrical circuit having short circuit and overload protection, said circuit comprising an electrical component to be protected, input means for supplying an input signal to said electrical component, sensing means connected to said electrical component for separately sensing the current through and the voltage across said electrical component and for supplying first and second outputs in response to said current and voltage respectively, integrating and combining means connected to said sensing means for integrating with respect to time and combining said outputs to produce a control signal which is representative at all times of the current through and the voltage across said electrical component, shunting means for shunting at least a portion of said input signal away from said electrical component and control means responsive to said control signal for operating said shunting means when said control signal is at a predetermined level whereby said protection circuit maintains a steady state, operating range of said electrical component within acceptable limits.

2. An electrical circuit as in claim 1, wherein said electrical component is an amplifying device.

3. An electrical circuit as in claim 1, wherein said electrical component is a transistor.

4. An electrical circuit as in claim 1, wherein the integrating and combining means further includes control means for providing said control signal corresponding to the differential of the thus integrated first and second outputs.

5. A electrical circuit as in claim 1, wherein said predetermined level of the control signal is a function of the duration and amplitude of current and voltage that said electrical component may safely tolerate.

6. A electrical circuit as in claim 1, wherein said means for integrating and combining said outputs includes means for combining the thus separately integrated outputs.

7. A electrical circuit as in claim 1, wherein said sensing and supplying means includes rectifier means for rectifying said outputs.

8. A transistorized amplifier circuit having short circuit and overload protection, said amplifier circuit comprising at least one transistor, to be protected, input means for supplying an input signal to said amplifier, sensing means connected to said transistor for sensing its operation, said sensing means being responsive to said operation and supplying a first output corresponding to the current flow in said transistor and a second output corresponding to the voltage across said transistor, integrating means connected to the sensing means for integrating with respect to time each of said first and second outputs, control means connected to said integrating means for providing a control signal output corresponding to the differential of the thus integrated first and second outputs, gate means connected across the input of said amplifier and adapted to shunt at least a portion of said input signal from said amplifier, said gate means being operated by said control signal and arranged to shunt said input when said control signal has a predetermined value corresponding to essentially the maximum duration and amplitude of current and voltage that said transistor may safely tolerate whereby said amplifier is not protected against very large instantaneous currents and voltages of short duration but having amplitude values beyond safe permissible levels.

9. An amplifier as in claim 8, wherein said transistor includes base, collector and emitter electrodes, and wherein an output load of the amplifier is connected across the collector and emitter electrodes, and said sensing means includes a first impedance means connected between said emitter electrode and a circuit reference point to measure the current flow through the emitter electrode and a second impedance means connected to said load to measure the voltage from the output load to a circuit reference point in said amplifier.

10. An amplifier as in claim 8, wherein said sensing and supplying means includes rectifier means for rectifying said outputs.

11. An amplifier as in claim 10, wherein said rectifier means includes first means for rectifying the voltage drops across said impedance means and said integrating means includes capacitor means connected across the output of said first rectifying means and said reference point.

12. An amplifier as in claim 11, wherein said rectifier means includes second means for rectifying with respect of said reference point the voltage across an output load and said integrating means includes capacitor means connected across the output of said second rectifying means and said reference point.

13. An amplifier as in claim 12, wherein said gate means includes a switching transistor having base, collector and emitter electrodes, the collector and emitter electrodes being connected to the input of said amplifier and said reference point, and said control means includes coupling impedance means for coupling the outputs of said first and second capacitor means to the base electrode of said switching transistor, said coupling impedance means being arranged to maintain said switching transistor off when said amplifier is under normal operating condition and conductive when the voltage across the output load reaches a predetermined low level corresponding to an unsafe steady state operating condition of said output driving transistor.

14. A method of protecting an amplifying device comprising supplying an input to said amplifying device, sensing said amplifying device and driving outputs corresponding to the current through and voltage across said amplifying device, combining and integrating with respect to time said outputs to produce a control signal which is representative at all times of the current through and the voltage across said amplifying device and shunting in response to said control signal at least a portion of the input to said amplifying device when said control signal is at a level corresponding essentially the maximum duration and amplitude of current and voltage said amplifying device may safely tolerate.

15. A method of protecting an amplifying device as in claim 12, wherein said outputs are separately integrated and then combined to produce said control signal.

16. A method of providing overload and short circuit protection for an amplifier having at least one amplifying means and output load, said method comprising supplying an input to said amplifier, sensing said amplifier and deriving a first output corresponding to the current flow in said amplifying means, and a second output corresponding to the voltage across said load, integrating with respect to time each of said first and second outputs, then combining the thus integrated first and second outputs to derive a control signal and shunting in response to said control signal a portion of the input away from said amplifier when said control signal is at a level corresponding to essentially the maximum duration and amplitude of current and voltage that said amplifying means may safely tolerate.

17. A method of providing overload and short circuit protection as in claim 16, wherein each of said first and second outputs are rectified before being integrated with respect to time.